March 15, 1966      E. A. ZADIG      3,241,138
RADAR SPEED METER
Filed Jan. 28, 1964
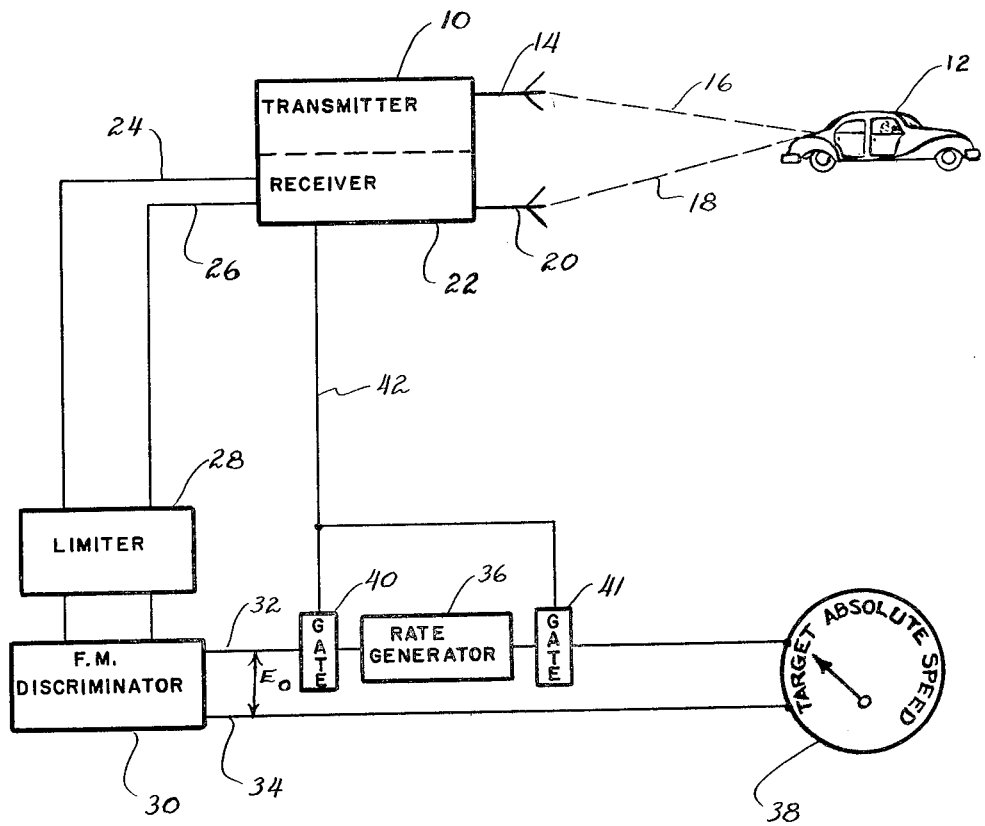
INVENTOR.
ERNEST A. ZADIG
BY
ATTORNEYS 3,241,138
RADAR SPEED METER
Ernest A. Zadig, 1 Bouton St., South Norwalk, Conn.
Filed Jan. 28, 1964, Ser. No. 340,729
3 Claims. (Cl. 343—8)

This invention relates to measurement of speed and, more particularly, to an improved apparatus for measurement of the absolute speed of a target vehicle from a moving vehicle on which the apparatus is mounted.

Radar speed measuring apparatus is, of course, well known to the art and is in commercial use by various police forces to measure the speed of moving vehicles from a stationary position adjacent active roadways.

For many reasons, however, it is desirable that the speed of vehicles be measurable from other moving vehicles. At present, this requires that the measuring vehicle (without the use of radar apparatus) pace the target vehicle, the speed of which is to be measured, for a sufficient distance to ensure accurate matching of speeds. This often introduces difficulty as, for example, in the apprehension of speeders by police since the pacing time must be sequentially followed by pursuit time.

It is, therefore, one object of this invention to provide an improved speed meter which can be mounted on a vehicle and which will measure the absolute speed of another vehicle.

In accordance with this object, there is provided, in a preferred embodiment of this invention, a speed measuring apparatus, mounted on a vehicle, comprising a volt meter to serve as an indicator unit, which unit is preferably calibrated in miles per hour. In addition to the meter, or in the alternative, recorders or similar calibrated instruments may be employed.

A transmitter and receiver is provided and is coupled to the necessary antenna in order to direct a high frequency continuous wave at the target vehicle and to receive the echo or signal bouncing off the target vehicle. As is known, the frequency of the received signal will differ from the frequency of the transmitted signal by an amount related to the relative speed between the vehicle on which the radar unit is mounted and the target vehicle. This frequency shift is termed the Doppler effect. A frequency measuring means is provided to measure the Doppler frequency and to generate a first output signal responsive to the measurement.

For example, the frequency measuring means may comprise a limiter and FM discriminator. The received signal is processed by a limiter to remove amplitude modulation of the signal and is applied to an FM discriminator tuned to the center frequency of the transmitted signal. Therefore, the discriminator will generate a direct voltage output signal, the amplitude of which is proportional to the difference in frequency between the received wave and the transmitted wave and the polarity of which will be indicative of whether the Doppler shift is a positive or negative shift.

If the first output signal, e.g., the output signal from the discriminator were applied directly to the indicator, the indicator would display only relative speeds. In order that the indicator display absolute speed of the target vehicle, a signal related to the speed of the vehicle on which the meter is mounted must be introduced. For this purpose, there is provided a rate generator to provide a second output signal, related to the speed of the vehicle on which the measurement is made. For example, the rate generator could be a D.C. generator to generate a signal, the amplitude of which is related to vehicle speed.

The signal from the rate generator and the signal from the FM discriminator are added algebraically and applied to the output indicator. If the signals from the rate generator and the FM discriminator or counting circuit are correctly phased, the indicator will provide an indication related to the absolute speed of the target vehicle. The rate generator will provide a signal related to the speed of the vehicle on which the measurement is made. The discriminator will provide a signal related to the relative speed between the instrument vehicle and the target vehicle. Thus, the algebraic addition of the two signals will provide an indication of absolute speed of the target vehicle.

In the absence of a target, the output indicator will display the speed of the measuring vehicle because no output will be received from the frequency measuring circuit and only the rate generator will affect the indicator. To eliminate such display, gate circuits are provided to cut off the indicator in the absence of a received signal of predetermined amplitude.

Having briefly described this invention, it will be explained in greater detail, along with other objects and advantages in the following portions of the specification, which may best be understood by reference to the accompanying figure which is a schematic diagram of the improved speed meter constructed in accordance with the present invention.

In the figure, there is shown the improved speed meter comprising a transmitter 10 to generate the high frequency continuous wave signal which is beamed at a target vehicle 12 by antenna 14 as indicated by the dotted path line 16. The signals bouncing off the target vehicle are returned over the dotted path line 18 to a receiving antenna 20 which applies the received signals to a receiver 22 for detection and amplification. The receiver output over leads 24 and 26 is, thus, a continuous-wave, high frequency signal, the frequency of which will differ from the frequency of the transmitted wave by the Doppler phenomenon. Thus, for example, if the target vehicle 12 were proceeding at the same rate of speed as the vehicle carrying the transmitter and receiver, the received signal would be of the same frequency as the transmitted frequency. If the measuring vehicle is travelling at a higher rate of speed than the target vehicle 12, the received signal will be higher than the transmitted frequency and conversely, if the target vehicle is moving faster than the measuring vehicle, the received frequency will be lower than the transmitted frequency. The received signal is processed by a limiter circuit 28, the purpose of which is to remove amplitude variations in the received signal. The limiter may, for example, be a tuned radio frequency amplifier operated at low plate voltage. For example, the operation of such an amplifier as a limiter is explained in connection with FIGURES 9–44 on page 344 of Application of Electron Tubes, by Reich, McGraw-Hill Book Company, Inc., 2nd edition, 1944.

The limited signal is then applied to an FM discriminator 30 which, for example, may comprises the discriminator circuit of FIGURES 9–44 of the above referenced Application of Electron Tubes. The discriminator is tuned to the center frequency of the transmitted continuous wave. As will be noted from the characteristics of this type of discriminator, the output voltage $E_0$ on leads 32 and 34 will be a direct voltage, the amplitude of which is related to the frequency difference between the transmitted wave and the received wave and the polarity of which is related to the direction of the frequency difference.

A rate generator 36 is provided to generate a direct voltage, the amplitude of which is related to the speed of the measuring vehicle. For example, this might be any of the conventional rate generators as, for example, used in tachometer or speedometer indicator arrangements and the like. Since the measuring vehicle would rarely make speed measurements when moving in reverse, the rate generator would normally provide a signal of one predetermined polarity characteristic with an amplitude variation related to vehicle speed. The signal from the rate generator and the signal from the FM discriminator are algebraically added as shown, and the composite signal is applied to a voltage meter 38 which is preferably calibrated in terms of absolute speed of the target vehicle in miles per hour. In effecting the algebraic addition, the polarity of the signal from the discriminator must be properly oriented with respect to the polarity of the rate generator to provide the desired composite signal. Thus, for example, if the target vehicle is moving faster than the measuring vehicle, the Doppler frequency will be lower than the center frequency and the output voltage $E_0$ of the discriminator must add to the signal from the rate generator. On the other hand, if the measuring vehicle is moving faster than the target vehicle, the Doppler shift will be to a higher frequency and the output voltage $E_0$ must subtract from the rate generator signal. In order to prevent an erroneous indication when there is no target or if the intended target is out of range, gates 40 and 41 are provided to selectively cut off the signal from the rate generator. The gates are triggered from the receiver circuitry over lead 42. The gates may be, in the simplest form, relay switches actuated in response to the existence of a signal in the receiving circuitry which exceeds a pre-established minimum signal. Although the minimum signal could theoretically be zero, the existence of unavoidable noise spikes, etc., usually makes preferable an arrangement in which the gates are opened only when a signal of predetermined amplitude is present. This expedient arrangement also eases the design of the limiter circuit 28.

Thus, in operation, if the target vehicle 10 is within range of the measuring vehicle, a return signal will exist in the receiver, opening the gate circuits 40 and 41. At this time, if the received frequency coincides with the transmitted signal, the measuring vehicle and the target vehicle are moving at the same speed, the discriminator output will be zero and the indicated absolute speed of the target vehicle on the output indicator 38 be determined by the rate generator signal 36 alone. If the target is moving faster than the measuring vehicle, the Doppler shift will provide an output signal $E_0$ which adds to the signal from the rate generator to indicate a higher target vehicle speed on indicator 38. If the measuring vehicle is moving faster than the target vehicle, the received signal will be higher than the transmitted signal and the discriminator output $E_0$ will be subtracted from the rate generator signal.

It is preferable that the rate generator be linear with respect to the speed of the measuring vehicle and that the output of the discriminator 30 be linear with respect to frequency shift over the entire operating range of the instrument.

For example, a radar speed meter unit is shown on pages 48–49 of Electronics, Mar. 6, 1959. It should be noted that the meter described includes limiting circuitry, thus incorporating the limiter 28. For operation of the gate circuit, the gate operating signal can be derived from diode $V_7$ or the plate of $V_{4a}$, the voltage on each of which indicates a target within range.

This invention may be variously modified and embodied within the scope of the subjoined claims.

What is claimed is:
1. An instrument for mounting on a moving vehicle to measure the absolute speed of a target vehicle comprising a transmitter to transmit a high frequency continuous wave signal from the measuring vehicle to the target vehicle, receiver means to receive signals reflected from the target vehicle and to amplify said received signal, frequency measuring means to measure the frequency difference between said transmitted and said received signal and to generate a first output signal responsive thereto, said first signal having an amplitude responsive to the measured difference in frequency and a polarity corresponding to the direction of the frequency difference from the transmitted signal, a rate generator to generate a second output signal related to the speed of the measuring vehicle, an indicator, circuit means for serially coupling said first output signal and said second output signal to said indicator, said serial coupling being an algebraic coupling so that said indicator indicates the absolute speed of the target, said circuit means including gate circuit means coupled across said rate generator, a second circuit means coupling said gate circuit means to said receiver, said gate circuit means being responsive to the received signal in said receiver to cut off said serially coupled second output signal when said received signal is below a redetermined amplitude so that, in the absence of a signal of predetermined amplitude from said target vehicle, no signal will be applied to said indicator.

2. An instrument in accordance with claim 1 in which said frequency measuring means comprises a limiter to process said received signal and to remove amplitude modulation therefrom, an FM discriminator circuit to process said limited signal, said FM discriminator being tuned to the transmitted frequency thereby to generate the first output signal, the amplitude of which varies in response to the frequency variation between the transmitted and the received signal, and the polarity of which varies in response to the direction of frequency variation from the transmitted frequency, and in which said gate circuit means comprises a first gate serially coupling said first output signal to said rate generator, and a second gate serially coupling said rate generator to said output indicator, each of said first and second gates being normally conductive, each of said first and second gates being coupled to said receiver and being responsive to the amplitude of said received signal in said receiver to change to a non-conductive state when the amplitude of said received signals falls below a predetermined amplitude.

3. An instrument in accordance with claim 1 in which said output signal of said discriminator would be positive when the received signal is of higher frequency than the transmitted signal and in which said discriminator is coupled to said rate generator so that said discriminator signal is in bucking relationship to said rate generator signal.

References Cited by the Examiner
UNITED STATES PATENTS

| | | | |
|---|---|---|---|
| 2,621,243 | 12/1952 | Sunstein | 343—8 |
| 3,118,139 | 1/1964 | Durstewitz | 343—8 |

CHESTER L. JUSTUS, *Primary Examiner.*

R. D. BENNETT, *Assistant Examiner.*